E. A. HAWTHORNE.
VEHICLE LAMP.
APPLICATION FILED MAR. 9, 1916.
1,224,463.
Patented May 1, 1917.
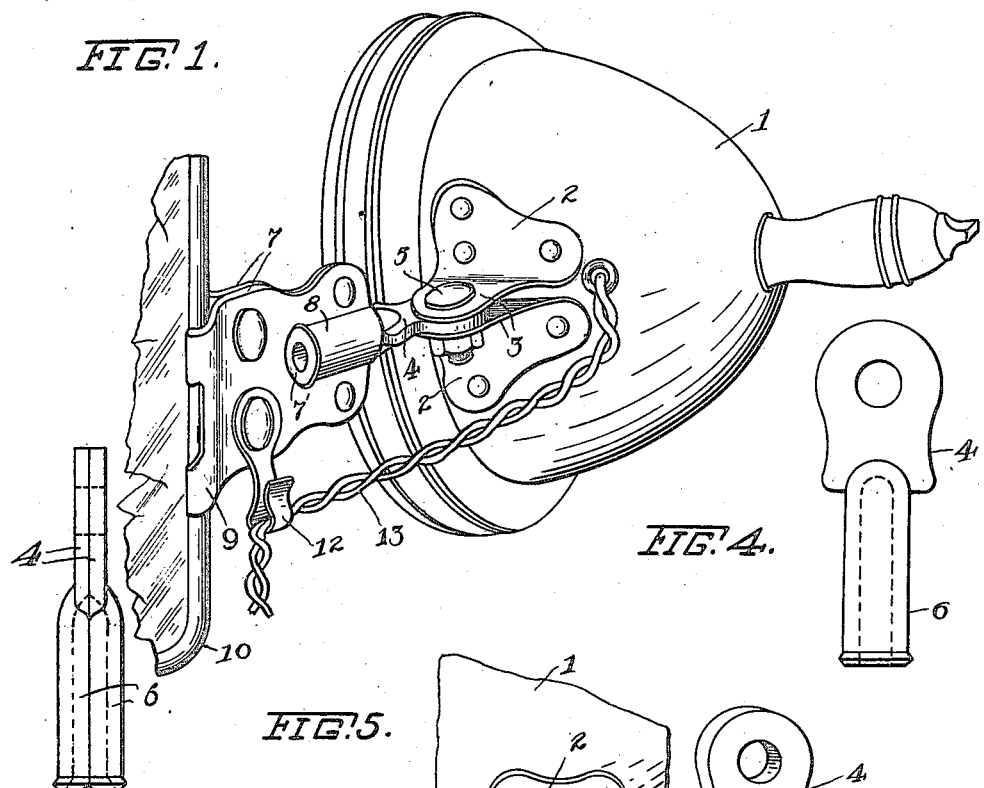
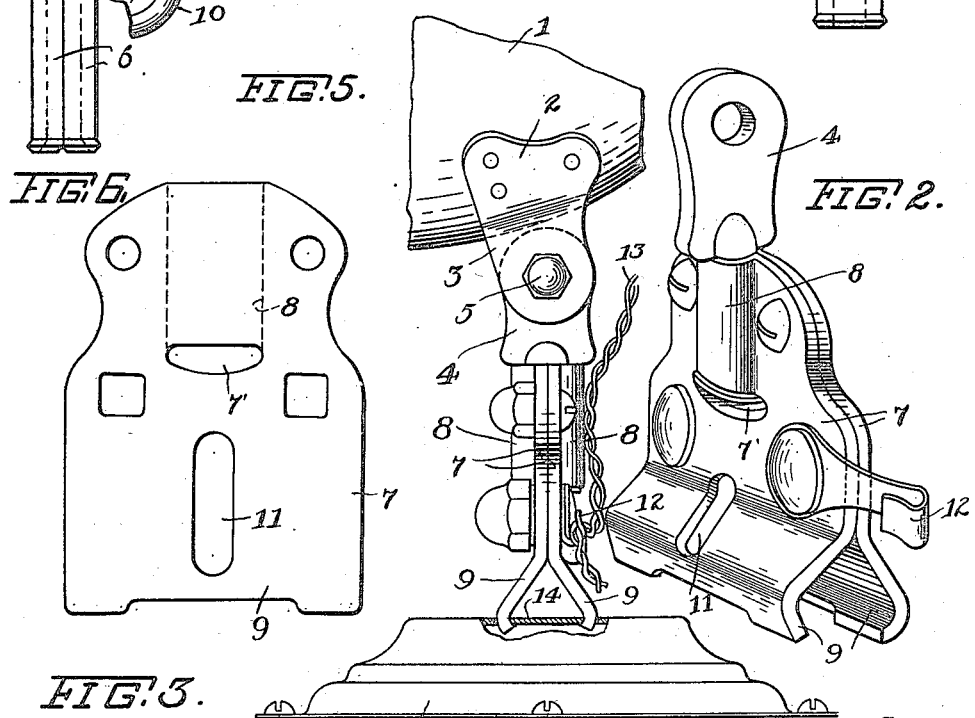
Inventor
Ellsworth A. Hawthorne
By [signature]
Attorney

UNITED STATES PATENT OFFICE.

ELLSWORTH A. HAWTHORNE, OF BRIDGEPORT, CONNECTICUT.

VEHICLE-LAMP.

1,224,463. Specification of Letters Patent. Patented May 1, 1917.

Application filed March 9, 1916. Serial No. 83,192.

*To all whom it may concern:*

Be it known that I, ELLSWORTH A. HAWTHORNE, a citizen of the United States, residing at Bridgeport, county of Fairfield, State of Connecticut, have invented certain new and useful Improvements in Vehicle-Lamps, of which the following is a specification.

This invention relates to vehicle lamps, and particularly to a bracket therefor whereby the lamp may be attached in variable positions upon an automobile or other vehicle.

The objects of my invention are to provide a bracket which will permit the lamp to be positioned at any desired angle with respect to either a horizontal or a vertical axis, whereby the lamp may have universal adjusting movement; to provide a bracket which will be rigid so as not to rattle when attached, and which may readily be detached and used as a trouble-lamp or the like, and to provide a bracket of inexpensive construction which may be manufactured with the minimum number of operations.

These and various other features which will appear hereinafter, are secured in the device of the present invention, the construction and manner of operation of which are fully disclosed in the specification which follows. In the drawings accompanying that specification I have shown a practical embodiment which has been found satisfactory in use and well adapted to the requirements of manufacture.

Figure 1 is a perspective view of a lamp and bracket in accordance with my invention, attached to a windshield.

Fig. 2 is a perspective view of the swivel bracket, removed.

Fig. 3 is a plan view of a blank from which one of the duplicate clamping jaws of the bracket is formed, Fig. 4 is a similar view of one of the swivel members of the bracket, Fig. 5 is a view showing an adaptation for use with motor boats, canoes and the like, and Fig. 6 is an edge view of the pintle forming member.

The lamp 1 is preferably an electric lamp of the type known as "spot-light." Secured to the shell or casing thereof is a pair of duplicate attaching plates 2 having upturned oppositely disposed spaced ears 3 between which a pair of similarly shaped swivel members 4 is secured by a bolt or other suitable fastening 5. The swivel members 4 consist of suitably shaped plates having pintle-forming portions 6 pressed out in opposite directions, and which, when the plates are secured together, provide a tubular pintle adapted to be received in a similarly formed pintle-socket formed in a pair of duplicate clamping members 7. Obviously, however, the swivel element of the clamp might be made as a one piece casting.

The clamping members 7 consist of suitably shaped plates having oppositely disposed slots 7' therein, from which to the upper ends of the plates extend socket-forming portions 8 which are pressed out in opposite directions to define an open-ended socket for the pintle 6 when the plates are secured together. The slots 7' allow the pintle slight end-wise play in the socket.

Below the socket 8 the members 7 are bent in opposite directions providing curved clamping jaws 9 adapted for engagement over any suitable support as the edge 10 of the windshield. Each jaw 9 may further be slotted as indicated at 11 to receive a bolt or the like, whereby to positively lock the jaws to a support, if desired. If desired, one of the clamping members 7 may carry a hook 12 to receive and guide the electrical cord 13 of the lamp.

In the form shown in Fig. 5, the clamping jaws are adapted to be entered in grooves 14 formed in a suitable base element 15 which may be rigidly fastened to a suitable part of a motor-boat, canoe, or the like, thereby adapting the lamp for marine use.

From the above it will be seen that blanks for substantially all the parts of my improved bracket may be stamped out and then pressed and bent, as shown and described, producing an extremely simple and inexpensive construction. It will further be seen that the lamp has swinging movement about the pivot 5 as a vertical axis and about the pintle 6 as a horizontal axis, considering the parts as shown in the Fig. 1 position, thus providing a universal adjusting movement of the light.

Various modifications in the form and construction of my invention may obviously be resorted to within the limits of the appended claims:

1. A bracket comprising a pair of members having oppositely-faced portions defining a pintle socket, and having oppositely-faced jaws defining a seat for a supporting element, means for closing said socket about a pintle and setting said clamping jaws, and means carried by the pintle and engaging the pair of members for preventing accidental withdrawal of the pintle from said socket.

2. A bracket consisting of a pair of clamping members having oppositely pressed-out portions defining a pintle socket, a pair of swivel members having oppositely disposed pressed-out portions constituting a pintle arranged for lodgment in said socket, and means for pivotally attaching said swivel members to a lamp or the like.

3. A bracket consisting of a pair of clamping members having oppositely disposed jaws and having oppositely pressed-out portions defining a pintle socket arranged in the major axis of the bracket, a pair of duplicate swivel members having oppositely disposed pressed-out portions constituting a pintle arranged in alinement with the pintle socket, and a pair of duplicate plates having oppositely disposed spaced ears between which said swivel members are fastened for pivotally attaching said members to a lamp or the like.

4. A bracket comprising in combination a headed pintle adapted to be attached to an object to be supported, and a pair of clamping members having oppositely disposed pressed-out portions constituting an open ended socket for said pintle and having opposed slots adapted to rotatably receive the head of said pintle.

5. A bracket having oppositely faced portions defining an axial pintle socket and having similarly faced movable clamping jaws arranged transverse to said socket, a pintle disposed for lodgment in said socket, means for pivotally attaching said pintle to an object to be supported, and means on the pintle for preventing accidental withdrawal thereof from the socket.

6. A clamp consisting of a pair of substantially flat members adapted to be fastened upon each other face to face and terminating in oppositely disposed outwardly curved hook-like clamp jaws defining a concaved seat for the reception of the support upon which the clamp is mounted, and said members having opposite portions of their contiguous faces pressed outwardly to define a pintle socket arranged transverse to said clamp jaws and adapted to receive a pintle, and a pintle in said socket having means adapting it for pivotal connection with an object to be carried by said clamp.

7. A clamp consisting of a pair of substantially flat members adapted to be fastened upon each other face to face and terminating in oppositely disposed outwardly curved hook-like clamp jaws defining a concaved seat for the reception of the support upon which the clamp is mounted, and said members having opposite portions of their contiguous faces pressed outwardly to define a pintle socket arranged transverse to said clamp jaws and adapted to receive a pintle, and having oppositely disposed slots at the inner ends of said socket, and a headed pintle seated in said pintle socket with its head freely received in said slots.

8. A bracket for attaching a lamp or the like in universally adjustable relation upon a windshield or other suitable support, comprising opposed members each having a complemental pintle socket recess and each having a complemental clamping jaw disposed at substantially right angles to said socket, a pintle revolubly mounted in said socket and adapted for pivotal connection with a lamp or the like laterally thereof, said revoluble pintle permitting adjustment of the lamp about one axis and the pivotal connection between the lamp and pintle permitting adjustment of the lamp about another axis to secure said universal adjustment, and means for connecting said members to set the clamp jaws and inclose the pintle.

9. A bracket for attaching a lamp or the like in universally adjustable relation upon a windshield or other suitable support, comprising similar members each having a semicylindrical pintle socket embossment and each having a complemental clamping jaw disposed at substantially right angles to said socket, a pintle revolubly mounted in said socket and adapted for pivotal connection with a lamp or the like laterally thereof, said revoluble pintle permitting adjustment of the lamp about one axis and the pivotal connection between the lamp and pintle permitting adjustment of the lamp about another axis to secure said universal adjustment, and means for detachably connecting said members to set the clamp jaws and inclose the pintle.

10. A pintle member comprising a pair of oppositely faced parts each having a shank portion of complementary cylindricity and a complementary attaching portion.

11. A pintle member comprising a pair of oppositely faced stampings, each having a headed shank portion of complementary cylindricity and a complementary attaching portion.

12. In combination, a mounting clamp having opposed clamp jaws and a base having jaw receiving openings on each side of an intermediate portion adapted to be engaged by said clamp jaws.

13. In combination, a mounting clamp having opposed clamp jaws and a base having an attaching area and an engageable area raised above the plane of the attaching area and provided with spaced jaw receiving openings on each side of an intermediate portion adapted to be engaged by said clamp jaws.

In testimony whereof I affix my signature in presence of two witnesses.

ELLSWORTH A. HAWTHORNE.

Witnesses:
E. HORACE HAWTHORNE,
ANNA AMELIA ZUBRESKY.